(12) United States Patent
Aubry et al.

(10) Patent No.: US 7,194,887 B2
(45) Date of Patent: Mar. 27, 2007

(54) PRESS FOR HOLDING AND PRESSING A WORKPIECE

(75) Inventors: Patrick Aubry, Crouy en Thelle (FR); Alain Paul Bourgeois, Rueil Malmaison (FR); Alain Georges Henri Lorieux, Sannois (FR)

(73) Assignee: Snecma Moteurs, Paris (FR)

( * ) Notice: Subject to any disclaimer, the term of this patent is extended or adjusted under 35 U.S.C. 154(b) by 14 days.

(21) Appl. No.: 11/065,043

(22) Filed: Feb. 25, 2005

(65) Prior Publication Data
US 2007/0033983 A1 Feb. 15, 2007

(30) Foreign Application Priority Data
Feb. 27, 2004 (FR) .................................. 04 02005

(51) Int. Cl.
*B21D 5/02* (2006.01)
*B21D 13/02* (2006.01)
(52) U.S. Cl. .............................. 72/455; 72/456; 72/352
(58) Field of Classification Search ................. 72/343, 72/352, 454, 455
See application file for complete search history.

(56) References Cited

U.S. PATENT DOCUMENTS

| 2,958,362 | A | * | 11/1960 | Creek ........................... 72/412 |
| 4,372,144 | A | * | 2/1983 | Valentine et al. .............. 72/352 |
| 4,989,440 | A | * | 2/1991 | Sjogren ........................ 72/385 |
| 5,365,767 | A | * | 11/1994 | Kitchen et al. ............. 72/481.1 |
| 5,715,721 | A | * | 2/1998 | Anders et al. ................. 72/311 |
| 6,536,257 | B2 | * | 3/2003 | Nishigori et al. ........... 72/354.2 |

FOREIGN PATENT DOCUMENTS

GB 721478 1/1955

OTHER PUBLICATIONS

Patent Abstracts of Japan, JP 61-49734, Mar. 11, 1986.

* cited by examiner

*Primary Examiner*—David Jones
(74) *Attorney, Agent, or Firm*—Oblon, Spivak, McClelland, Maier & Neustadt, P.C.

(57) ABSTRACT

The press of the invention includes a first component and a second component for holding and pressing a workpiece to be processed between them, the first component being driven into translation relatively to the second component by an air cylinder. Thus, the first component is floatably mounted relatively to the second component, said components comprising means for positioning them relatively to each other at the limit of travel. Proper centering of the workpiece between the components, without stresses, may thereby be provided.

23 Claims, 3 Drawing Sheets

PRESS FOR HOLDING AND PRESSING A WORKPIECE

The invention relates to a press for holding and pressing a workpiece, in particular a titanium blade of a turbine engine.

For example, a turbojet compressor blade is a workpiece formed by forging. First of all, the blade is stamped. This operation gives its shape to the blade, but also induces stresses inside it, which have to be balanced. For this purpose, the blade is put into a press, where it is heated and pressed between two dies including a pattern cavity, the shape of which corresponds to that of the blade. As a result, relaxation of the stresses occurs within the blade.

The prior art, notably for workpieces such as fan blades, teaches the use of a press including at least one platen supporting a die, which is translationally movable by a hydraulic cylinder vertically, in order to generate pressure on the titanium blade by pressing it against the other die, itself also supported by a platen. The whole is inserted in an oven having an isothermal enclosure, conventionally heated at a temperature located between 700° C. and 900° C. for a determined time.

The blades are of complex three-dimensional shapes. Bad positioning of the blade between the dies may generate application of an uneven pressure over its surface and therefore formation of new stresses, which is the opposite of the desired purpose. Adjusting the dies relatively to each other is therefore very delicate, and a minute variation of the angle of attack of the movable die causes the aforementioned drawbacks.

The present invention is directed to finding a remedy for these drawbacks.

For this purpose, the invention relates to a press, including a first component and a second component for holding and pressing a workpiece to be processed between them, the first component being driven into translation relatively to the second component by driving means, characterized by the fact that the first component is floatably mounted relatively to the second component and said components comprise means for positioning them relatively to each other at the limit of travel.

By floatably, it is understood that the first component includes motion freedoms in a certain number of directions, possibly in the six directions, to a certain extent, i.e., dimensionally restrained relatively to the dimension of the translational travel allowed by the driving means.

Preferably, the press comprises translational guiding means for the first component and play is provided between the first component and the guiding means.

Further preferably, the first component and the second component each comprise a die for holding and pressing the workpiece.

Still preferably, the means for positioning the first component relatively to the second component comprise at least one positioning finger cooperating with a bore.

Advantageously, in this case, the die of the first component comprises at least one so-called positioning finger, and the die of the second component comprises at least one so-called bore.

Still advantageously, each positioning finger comprises a portion with a cylindrical shape and a portion with a frusto-conical shape.

In the preferred embodiment of the press of the invention, the driving means comprise an air cylinder.

According to another feature of the invention, the press, positioned vertically, includes at least one spacer for supporting the first component in a position and second means for translationally driving the second component relatively to the first component.

Preferably, in this case, the second translational driving means comprise a hydraulic cylinder.

According to the invention, each component comprises a platen and a heating insulating support supporting the die.

Advantageously in this case, at least one thermal insulating layer is positioned at the periphery of the dies.

Preferably, at least one heating insulating support comprises heating resistors.

According to a first embodiment of the invention, the heating resistors are contained in cartridges.

According to a second embodiment of the invention, the heating resistors are embedded and crimped into the heating insulating support.

The invention in particular relates to the use of a press for thermal straightening out of a turbine engine blade formed by forging, but the applicant does not intend to limit the scope of its rights to this application.

The invention will be better understood with the help of the following description of the preferred embodiment of the press of the invention, with reference to the appended drawing, wherein.

Figure 1:
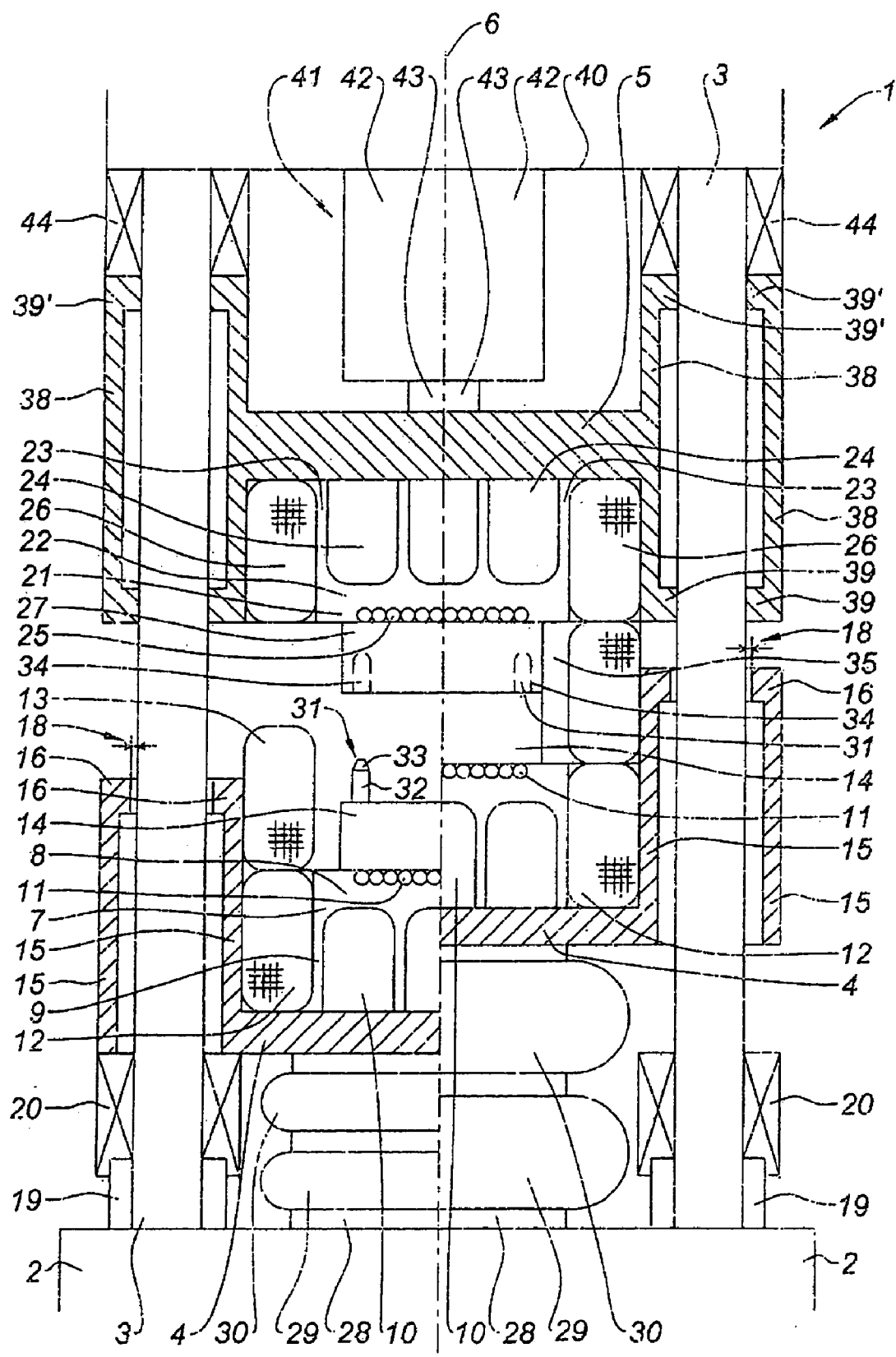
FIG. 1 illustrates a schematically sectional profile view of the preferred embodiment of the press of the invention, with the lower die in the low position, for the left half of FIG. 1, and the upper die in the high position, for the right half of FIG. 1.

With reference to FIG. 1, the press 1 of the invention comprises a structural base 2, supporting four columns 3, which form a parallelepipedous frame, or chassis of the press 1. Columns 3 support a lower platen 4 and an upper platen 5, of a circular shape here. In FIG. 1, press 1 is illustrated in two different configurations, FIG. 1 being cut into two portions, on either side of a vertical global symmetry plane 6 of press 1. The lower platen 4 is translationally movable vertically. To the left of the plane of symmetry 6, the lower platen 4 is illustrated in the low position, to the right of the plane of symmetry 6, the lower platen 4 is illustrated in the high position, as is more specifically described later on.

The lower platen 4 in its central portion, supports a heating insulating lower support 7, which comprises a circular platen 8 supported by vertical walls 9. Platen 8 may assume another shape. The vertical walls 9 define between them cavities 10 containing a thermal insulator, for example comprising ceramic fibers. The platen 8 of the heating insulating lower support 7 contains heating resistors 11 which will be more specifically described later on.

The lower platen 4 along its peripheral portion supports a lower thermal insulating layer 12 around the heating insulating lower support 7 and over the height of the latter. This lower thermal insulating layer 12 as for it supports an intermediate thermal insulating layer 13, which extends at right angles from the lower thermal insulator 12, above the level of the heating insulating lower support 7.

The platen 8 of the heating insulating lower support 7 supports a lower die 14 for pressing a workpiece formed by forging, the latter being not shown. Here, the die 14 is of a circular shape.

Figure 2:
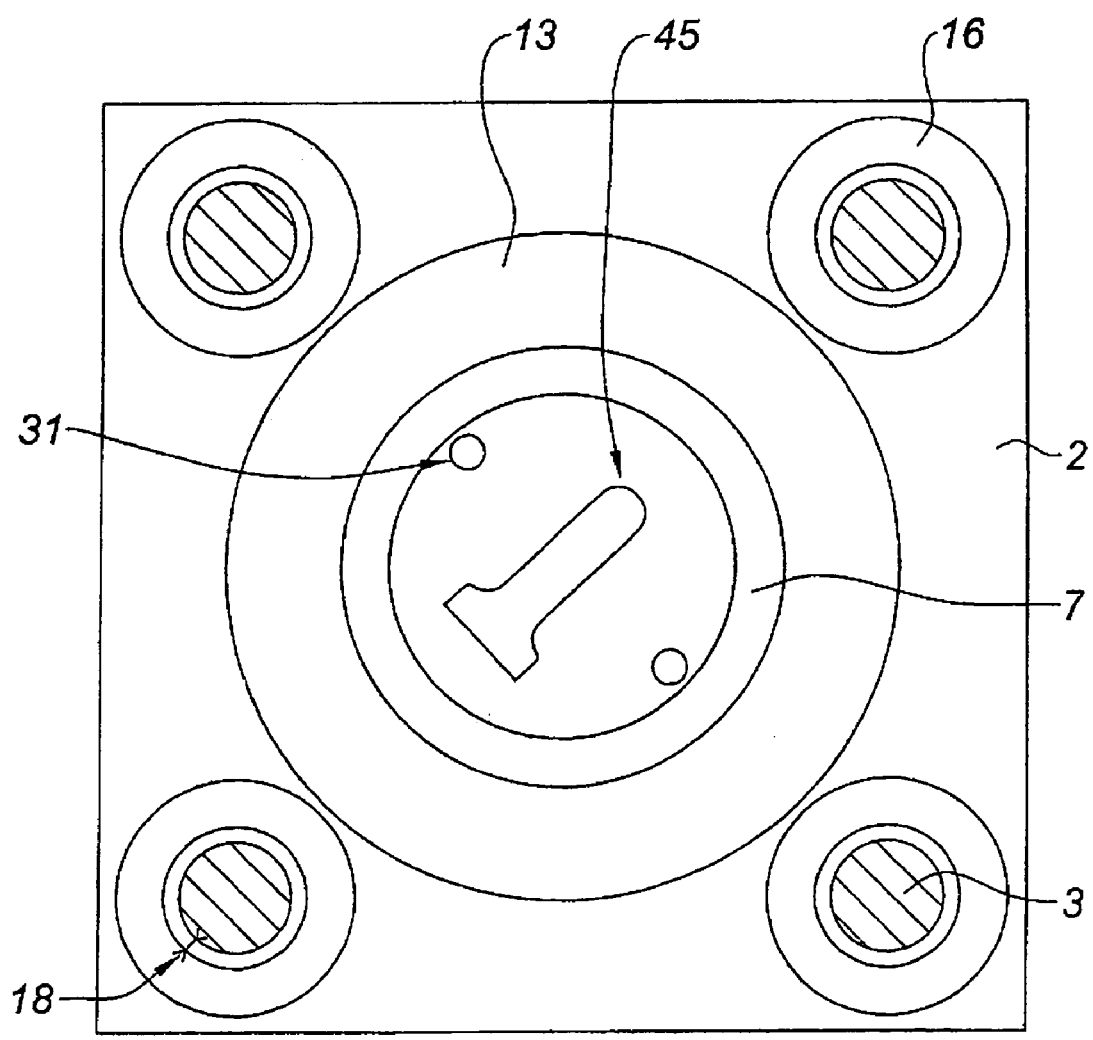
FIG. 2 illustrates a schematic top view of the lower portion of the preferred embodiment of the press of the invention.

With reference to FIG. 2, the lower die 14 comprises a pattern cavity 45, the shape of which, for its lower half, fits into the shape of the workpiece formed by forging, which is a titanium blade of a turbojet engine in the preferred embodiment of the invention.

Between the platen 8 of the heating insulating lower support 7 and the lower die 14, a system of sloped shims may be provided for suppressing play between both of these components 8, 14 and for advantageously replacing a conventional screw-and-nut assembly, unsuitable for uses at high temperature.

The lower platen 4 supports in four two-by-two diametrically opposite points, a sleeve 15, surrounding the column 3 corresponding to the considered corner, extending above platen 4, outside the latter. The sleeve 15 at its lower end is integral with the lower platen 4. Each sleeve 15 at its upper end includes a ring 16 intended to translationally slide along column 3. By means of sleeves 15, the lower platen 4 is integral with the rings 16 which, with their corresponding column 3, fulfill a function for translationally guiding the lower platen 4.

The slider link between each ring 16 and the corresponding column 3 is achieved with play. This play is illustrated in FIGS. 1 and 2 by an arrow 18. This play notably allows translational and rotational motions in the plane perpendicular to the axis of the translation, i.e., here the horizontal plane, as well as rotational motions around axes included in this plane.

At the base of each column 3, on its base 2, press 1 comprises a shim 19, supporting a spacer 20 supporting the lower platen 4, through the base of its sleeves 15, when the lower platen 4 is in the low position. With the spacers 20, the desired altitude of the lower platen 4 in the low position may be adjusted.

The upper platen 5 supports in its central portion a heating insulating upper support 21 which comprises a circular platen 22 supported by vertical walls 23. The platen 22 may assume another shape. The vertical walls 23 define between them cavities 24 containing a thermal insulator, for example comprising ceramic fibers. The platen 22 of the heating insulating upper support 21 contains heating resistors 25 which are described more specifically later on.

The upper platen 5 supports an upper thermal insulating layer 26 along its peripheral portion, around the heating insulating upper support 21 and over the height of the latter.

The platen 22 of the heating insulating upper support 21 supports an upper die 27 for pressing the blade. Here, the die 27 is of a circular shape. The upper die 27 comprises a pattern cavity, the shape of which for its upper half fits into the shape of the blade. It is the complementary die of the lower die 14 for completely encircling the blade tightly.

The upper platen 5 is for the moment considered to be fixed in an upper position.

The lower die 14 includes two positioning fingers 31, located at two diametrically opposite points of the upper surface of the lower die 14 and protruding vertically out of the latter. Each positioning finger 31 comprises a lower portion 32 with a cylindrical shape and an upper portion 32 with a frusto-conical shape.

The upper die 27 includes two bores 34 for receiving a positioning finger 31, located at two points of the lower surface of the upper die 27 at a location corresponding to the location of the corresponding positioning finger 31 on the lower die 14. The diameter of each bore 34 corresponds to the diameter of the cylindrical portion 32 of the corresponding positioning finger 31.

The positioning fingers 31 of the lower die 14 are arranged in order to cooperate with the bores 34 of the upper die 27 so that, when the positioning fingers 31 are fitted into the bores 34, the lower 14 and upper 27 dies are exactly positioned relatively to each other in order to press the blade which they encircle tightly and uniformly. The arrangement of the position fingers 31 and of the bores 34 is therefore made according to the pattern cavities which the dies 14, 27 comprise, so that the latter are exactly positioned facing each other when the positioning fingers 31 are fitted into the bores 34.

The position fingers 31 and the bores 34 cooperate in order to fulfill a function for positioning the lower die 14 relatively to the upper die 27. Other positioning means may be contemplated, for example shapes machined on the dies 14, 27, in a complementary way, so as to fit each other and properly position the lower die 14 relatively to the upper die 27.

The base 2 of the press 1 of the invention supports an air cylinder 28. This air cylinder 28 on its lower portion is integral with the base 2, and on its upper portion is integral with the lower portion of the lower platen 4. Between both of them, it comprises an air cushion, or air bag, for example in rubber, including two bellows 29, 30, located one above the other, and which may be inflated or deflated by air arriving from or flowing towards valves, not shown.

When the air cylinder 28 is deflated, as in the case on the left portion of FIG. 1, the lower platen 4 is in the low position, resting on the spacers 20, at the altitude required by the dimensioning of the spacers 20. The lower die 14 is then moved away from the upper die 27.

When the air cylinder 28 is inflated, it causes the lower platen 4 to be translated vertically upwards. This translation is allowed by the translation performed by the rings 16 integral with the lower platen 4 on the columns 3.

Because of the play 18 existing between the rings 16 and the corresponding columns 3, the lower platen 4 and therefore the lower die 14 which is integral therewith by means of the heating insulating lower support 7, are translationally and rotationally free on and around the horizontal plane, at least as allowed by the play 18. It is therefore floatably mounted on the air cylinder 28 which drives it into vertical translation.

When the lower die 14 is near the upper die 27 and the air cylinder 28 continues to be inflated, the positioning fingers 31 are inserted in the corresponding bores 34 with their frusto-conical portion 33. Because of the floatability of the lower die 14 on the air cylinder 28, the latter is not exactly positioned facing the upper die 27, therefore the positioning fingers 31 are not exactly placed facing the bores 34, to within the play 18.

The frusto-conical portions 33 tolerate such play 18, and their axis does not need to coincide with that of the bores 34 for them to be inserted. The play between the rings 16 and the corresponding columns 3 is dimensioned so that the positioning fingers 31 may always be inserted in their respective bores 34.

When the surfaces of the frusto-conical portions 33 of the positioning fingers 31 come into contact with the bores 34 and when the air cylinder 28 continues to be inflated, they slide over the lower edge of the bores 34 and the positioning fingers 31 are gradually placed in the axis of the bores 34, by horizontal translation and/or rotations, simultaneously at the vertical translation imposed by the air cylinder 28, of the lower die 14, allowed by the play 18 between the rings 16 and their respective column 3.

Translation then continues by the fitting of the cylindrical portions 32 of the positioning fingers 31 into their respective bores 34 and therefore by proper positioning of the lower 14 and upper 27 dies relatively to each other. When the lower die 14 presses onto the upper die 27, pressure results on the blade between both dies 14, 27.

Thermal straightening of the blade may now take place, because of the pressure exerted on the blade by both dies 14, 27, cooperating with the heating resulting from the heating resistors 11, 25 of dies 14, 27.

The lower 12, intermediate 13, and upper 26 thermal insulating layers are arranged so that, when the dies 14, 27 press against each other, the intermediate thermal insulating layer 13 comes into contact with the upper thermal insulating layer 26. Thus, when the dies 14, 27 are pressed against each other, the thermal insulating layers 12, 13, 26 fill all the peripheral space between both lower 4 and upper 5 platens, thereby forming with the lower 7 and upper 21 heating insulating supports, a thermally insulated heated enclosure 35, as is seen on the right portion of FIG. 1.

Heating is provided by the lower 11 and upper 25 heating resistors located in the platens 8, 22 of the lower 7 and upper 21 heating insulating supports, respectively, which will now be described in more detail, with reference to FIGS. 3 and 4. In the latter, the platen 8 of the lower heating insulating support 7 and its resistors 11 is illustrated in a top view, the platen 22 of the upper heating insulating support 21 and its resistors 25 being similar to them.

Figure 3:
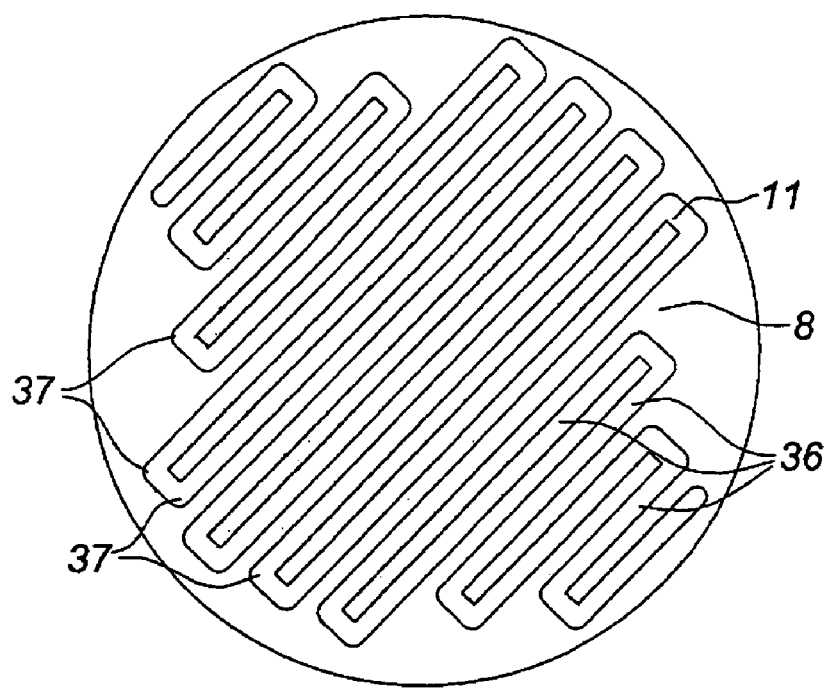
FIG. 3 illustrates a schematic top view of a first embodiment of the lower heating insulating support of the press of the invention.

A first embodiment of the resistors 11 of the platen 8 of the lower heating insulating support 7 is illustrated in FIG. 3. Here, the platen 8 is of a circular shape. The resistors 11 are contained in cartridges with rectilinear segments, in a zigzag arrangement. Thus, rectilinear portions 36 and half-turns made by two 37–90° bends, follow each other when the rectilinear portion 36 approaches the edge of the platen 8. The assembly is quite dense and provides relatively homogeneous heating.

Figure 4:
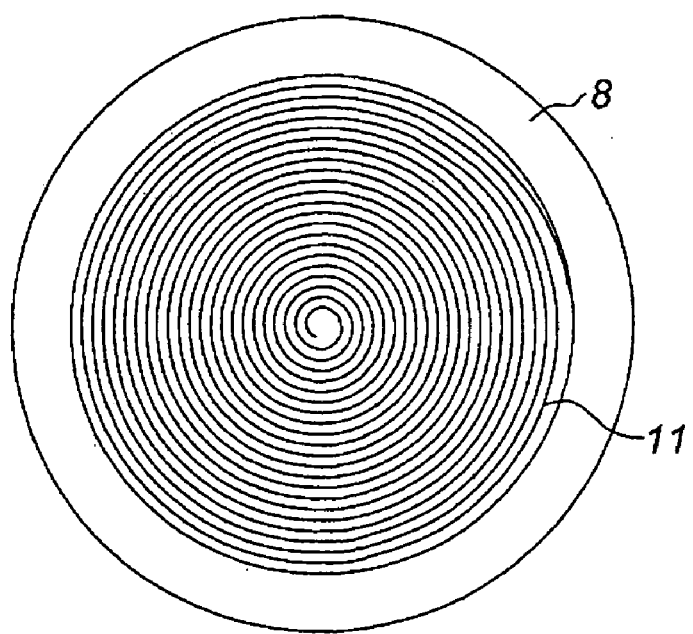
FIG. 4 illustrates a schematic top view of a second embodiment of the lower heating insulating support of the press of the invention.

A second embodiment of the resistors 11 of the platen 8 of the lower heating insulating support 7 is illustrated in FIG. 4. In this embodiment, resistors 11 are directly embedded and crimped in the platen 8, here according to a spiral pattern. For this purpose, they may for example be embedded in grooves machined in the platen 8, and then covered by metal powder deposited by a plasma torch, or by any other method well known to one skilled in the art. By means of this embodiment, it is possible to bring the resistors 11 closer and to obtain larger heating homogeneity.

Regardless of the adopted embodiment, resistors 11, 25 heat each die 14, 27, the whole being contained in the abovementioned isothermal enclosure 35. Temperature is therefore adjusted by means of resistors 11, 25, for example at a temperature of 700° C. Thermal straightening of the blade may be carried by pressing the dies 14, 27, associated with heating.

In the blade pressing embodiment described up to now, the upper platen 5 is fixed in the upper position, and the lower platen 4 is raised, by the air cylinder 29, in order to press the dies 14, 27 against each other.

Another operating mode of the press 1 of the invention is allowed by means of the device described hereafter, which is not incompatible with the device described earlier.

With reference to FIG. 1, the upper platen 5 supports in four two-by-two diametrically opposite points, a vertical sleeve 38, surrounding the column 3 corresponding to the relevant corner and meant to be above and below the upper platen 5, outside the latter.

Each sleeve 38 includes at each of its lower and upper ends, a ring 39, 39' respectively, for translationally sliding along the corresponding column 3. By means of the sleeve 38, the upper platen 5 is integral with rings 39, 39', which, with their corresponding column 3, fulfill a function for translationally guiding the upper platen 5. The slider link between each ring 39, 39' and the corresponding column 3 is provided without any play.

The columns 3 of the press 1 of the invention support a roof 40. This roof 40 supports a hydraulic cylinder 41. This hydraulic cylinder 41 comprises in the upper position, a cylinder 42, in which a piston 43, not shown, actuated by hydraulic means well known to one skilled in the art, is movably mounted, emerging from the lower side. The hydraulic cylinder 41 is integral with the roof 40 on the upper portion of its cylinder 42 and integral with the upper portion of the upper platen 5 on the lower portion of its piston 43.

At the top of each column 3, supported by roof 40, press 1 supports a spacer 44. The upper platen 5 abuts on these spacers 44, with the top of its sleeves 38, when it is in the high position, as is the case in the two portions of FIG. 1.

The hydraulic cylinder 41 is arranged for translationally displacing the upper platen 5 vertically, within the scope of the new operating mode of the press of the invention 1 described herein. In this operating mode, the lower platen 4 is fixed, in the low position, pressing against the spacers 20, as in the case of the left portion of FIG. 1, whereas the upper platen 5 is translationally movable by means of the hydraulic cylinder 41. The lower 14 and upper 27 dies are not the same as earlier and they notably do not comprise positioning fingers 31 and bores 34. Activation of resistors 11, 25 does not necessarily have to be provided any longer. This other operating mode corresponds to a range of different pressures and to the use of the inventive press 1 as a "conventional" press, not necessarily for application to thermal straightening.

This new operating mode is not incompatible with the former one. For example, to pass from one to the other, it is sufficient to change the dies 14, 27, the remainder of the device remaining identical, providing not insignificant savings of place within a production unit, for example.

When the piston 43 has risen again, the upper platen 5 is the high position, pressing against the spacers 44. With the lower platen 4 pressing against the spacers 20, the upper die 27 is then moved away from the lower die 14. When the hydraulic cylinder 41 is actuated and the piston 43 is moved downwards, the latter causes the upper platen 5 to translationally move vertically downwards. This translation is allowed by the translation performed by the rings 39, 39', integral with the upper platen 5, on column 3. At the limit of travel, the upper die 5 comes and rests on the lower die 4 and the press function is provided.

Thus, the press 1 of the invention provides a conventional press function with its lower platen 4 fixed in the low position and its upper platen 5 translationally movable vertically by means of the hydraulic cylinder 41 on the one hand, on the other hand it provides a press function for thermal straightening, with its upper platen 5 fixed and its lower platen 4 translationally movable vertically, by means of the air cylinder 28, with a certain floatability providing, by cooperating with the positioning fingers 31 and the bores 34, an easy and accurate positioning of the dies 14, 27 relatively to each other, the resistors 11, 25, and the different thermal insulators 10, 12, 13, 24, 26 providing the isothermal heating function required for this second thermal straightening function.

Another operating mode of the press of the invention, combining the earlier operating modes, will now be described.

This third use of the press 1 may be applied for thermally straightening out hollow large size blades, for example. The platens 8, 22 of the lower 7 and upper 21 heating insulating supports as well as the dies 14, 27, are then of a rectangular shape, because of the size of the blades. The dies 14, 27 include positioning means such as the fingers 31 and bores 34 described earlier.

Both dies 14, 27 are initially moved away from each other, in order to allow a blade to be loaded between them. The lower die 14 is then raised by means of the air cylinder 28, towards the upper die 27. This air cylinder 28, cooperating with the positioning means 31, 34, provides proper centering, without any stresses, of the blade between both dies 14, 27.

As the air cylinder 28 does not allow a sufficient force to be applied within the scope of the relevant method, the lower platen 4 is locked in its position, by means of spacers 20 dimensioned for this purpose. Here, the spacers 20, or shims, are thus removable and used when the intention is to lock the lower platen 4 in a position which is not necessarily the lowest position. Several sizes of spacers 20 may be provided, according to the applied method.

Once the lower platen 4 is locked in its position, the upper platen 5 will apply extra force, by the action of the hydraulic cylinder 41, which allows a larger pressure to be generated than the air cylinder 28 allows.

Thus, in this third use of the press of the invention, the air cylinder 28 provides proper centering, without any stresses, of the workpiece to be pressed, whereas the hydraulic cylinder 41 provides the function of further pressing the workpiece.

It is straightforward that this third operating mode is not incompatible with the use of heating resistors 11.

The invention claimed is:

1. A press comprising:
   a lower component and an upper component configured to hold and press a workpiece to be processed between the upper and lower components, the lower component being driven into translation relative to the upper component by driving means to a position where the lower component and the upper component are pressed against each other,
   wherein said driving means includes an air cylinder and the lower component is mounted on the air cylinder so as to float relatively to the upper component and said lower and upper components include means for positioning the lower and upper components relatively to each other when the lower and upper components near each other.

2. The press according to claim 1, comprising means for translationally guiding the lower component, a play being provided between the lower component and the guiding means.

3. The press according to claim 2, comprising at least one ring integral with the lower component and configured to slide on one column, play being provided between the ring and the column.

4. The press according to claim 1, wherein the lower component and the upper component each comprise a die for holding and pressing the workpiece.

5. The press according to claim 4, wherein the positioning means of the lower component comprise at least one positioning finger configured to cooperate with a bore.

6. The press according to claim 5, wherein the die of the lower component comprises the at least one positioning finger and the die of the upper component comprises the at least one bore.

7. The press according to claim 6, wherein each positioning finger comprises a portion with a cylindrical shape and a portion with a frusto-conical shape.

8. The press according to claim 4, wherein each component comprises a platen and a heating insulating support supporting the die.

9. The press according to claim 8, wherein at least one thermal insulating layer is positioned at the periphery of the dies.

10. The press according to claim 9, wherein at least one heating insulating support comprises heating resistors.

11. The press according to claim 10, wherein the heating resistors are contained in cartridges.

12. The press according to claim 10, wherein the heating resistors are embedded and crimped in the heating insulating support.

13. The press according to claim 1 wherein the air cylinder includes a bellows.

14. The press according to claim 1, positioned vertically, wherein the lower component is located in a lower position, and the upper component is located in an upper position.

15. The press according to claim 14, including at least one spacer for supporting the lower component in one position, and second means for driving into translation the upper component relatively to the lower component.

16. The press according to claim 15, wherein the second translation driving means comprise a hydraulic cylinder.

17. The press according to claim 16, wherein the spacer is removable.

18. The press according to claim 15, wherein the driving means for the lower component is configured to center the workpiece and the driving means of the second component is configured to press the workpiece.

19. A method for thermally straightening out a workpiece formed by forging, comprising:
    inserting the workpiece into the press of claim 1; and
    driving the lower component toward the upper component.

20. The method of claim 19, wherein the workpiece is a turbine engine blade.

21. The press according to claim 1, wherein the driving means is configured to drive the lower component along a predetermined distance, and
    the means for positioning is configured to position the lower and upper components only at one end of the predetermined distance.

22. The press according to claim 21, wherein the lower component is configured to float in six different directions.

23. The press according to claim 1, wherein the means for positioning positions the lower component relative to the upper component translationally and rotationally around a plane perpendicular to a direction of motion of the air cylinder.

* * * * *